United States Patent
Knapp

(10) Patent No.: US 7,243,227 B1
(45) Date of Patent: Jul. 10, 2007

(54) METHOD AND APPARATUS TO COPY PROTECT SOFTWARE PROGRAMS

(75) Inventor: Steven K. Knapp, Soquel, CA (US)

(73) Assignee: Xilinx, Inc., San Jose, CA (US)

( * ) Notice: Subject to any disclaimer, the term of this patent is extended or adjusted under 35 U.S.C. 154(b) by 585 days.

(21) Appl. No.: 09/949,234

(22) Filed: Sep. 7, 2001

(51) Int. Cl.
*H04L 9/00* (2006.01)

(52) U.S. Cl. .................................... 713/160
(58) Field of Classification Search ............... 713/153, 713/160, 161, 165, 167, 168, 200
See application file for complete search history.

(56) References Cited

U.S. PATENT DOCUMENTS

| | | | | |
|---|---|---|---|---|
| 5,613,012 | A * | 3/1997 | Hoffman et al. | 382/115 |
| 5,640,002 | A * | 6/1997 | Ruppert et al. | 235/462.46 |
| 6,154,879 | A * | 11/2000 | Pare et al. | 705/35 |
| 6,658,568 | B1 * | 12/2003 | Ginter et al. | 713/193 |
| 6,678,733 | B1 * | 1/2004 | Brown et al. | 709/229 |
| 6,725,379 | B1 * | 4/2004 | Dailey | 713/201 |
| 2002/0083339 | A1 * | 6/2002 | Blumenau et al. | 713/201 |

OTHER PUBLICATIONS

"Cirrus Logic's New Maverick EP7312 Processor Enables Flexible On-Chip Security For Consumer Internet Products," Press Release (Sep. 25, 2000).
Cirrus Logic, "Product Bulletin for Maverick EP7312," pp. 1-4 (Aug. 2000).
Keeloq® Code Hopping Devices, Microchip Technology Inc., 2 pgs. (Aug. 2001).
"Intel® Processor Serial No.," AP-909 Application Note, Order No. 245125-001, pp. 1-12 (Mar. 1999).

* cited by examiner

Primary Examiner—Kambiz Zand
Assistant Examiner—Aubrey H. Wyszynski
(74) Attorney, Agent, or Firm—Leroy D. Maunu; Blakely, Sokoloff, Taylor & Zafman

(57) ABSTRACT

A system and method are described for securing a configurable system on a chip (CSoC) or other programmable chip design to prevent unauthorized copying. A processor reads instructions from a memory device. The processor reads an identification code from an identification code provider. If no identification code has been previously imprinted on the memory, the processor imprints the provider identification code into the memory. If an identification code is already present, the memory identification code is compared with the provider identification code. If the memory identification code matches with the provider identification code, the processor is allowed to perform the program present on the memory. If the memory identification code does not match with the provider identification code, appropriate security countermeasures are taken. The program and identification code can be further encrypted on the memory for greater security, using the provider identification code as the encryption key.

22 Claims, 4 Drawing Sheets

METHOD AND APPARATUS TO COPY PROTECT SOFTWARE PROGRAMS

FIELD OF THE INVENTION

The field of the invention relates to program and design security. More specifically, it relates to protecting configurable system on a chip designs from copying.

BACKGROUND OF THE INVENTION

Configurable systems on a chip (CSoC) allow a single chip to be adapted to numerous circumstances. A Flash® memory device or some other memory device contains the customization program that loads the CSoC with the desired circuit design. The CSoC downloads the desired circuit design from the memory device and performs the functions specified by that design.

This portability of design makes security against copying difficult. A second user wishing to copy a first users design merely has to download the contents of the memory device into a second memory device. Numerous copies can be made without the manufacturer ever knowing it. The design can then be pirated around to other users.

Some processors, such as the Cirrus Logic Maverick processors and the Intel Pentium III processor, embed a unique identifier inside every device. This unique identifier is usually permanent and "programmed" into the device during manufacturing, either by laser trimming, fuses, or some other permanent means. Prior art may exist describing similar techniques for devices with embedded identifiers.

Some of the companies that provide copy-protection devices or software may employ similar techniques. These may be applied to software, or other intellectual property stored on programmable media, such as television shows, musical recordings, or others.

SUMMARY OF THE INVENTION

A system is described that includes a separate device that contains a unique identification code, a memory that is customized by storing the unique identification code, and a processor to compare the two.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicated similar elements and in which.

DETAILED DESCRIPTION

A system and method are described for securing a design for a configurable system on a chip (CSoC), microprocessor, microcontroller, or programmable logic device such as a field programmable gate array (FPGA) to prevent unauthorized copying. A processor reads instructions from a memory device. The processor reads an identification code from an identification code provider. If no identification code has been previously imprinted on the memory, the processor imprints the provider identification code into the memory. If an identification code is already present, the memory identification code is compared with the provider identification code. If the memory identification code matches with the provider identification code, the processor is allowed to perform the program present on the memory. If the memory identification code does not match with the provider identification code, appropriate security countermeasures are taken. The program and identification code can be further encrypted on the memory for greater security, using the provider identification code as the encryption key.

Figure 1:
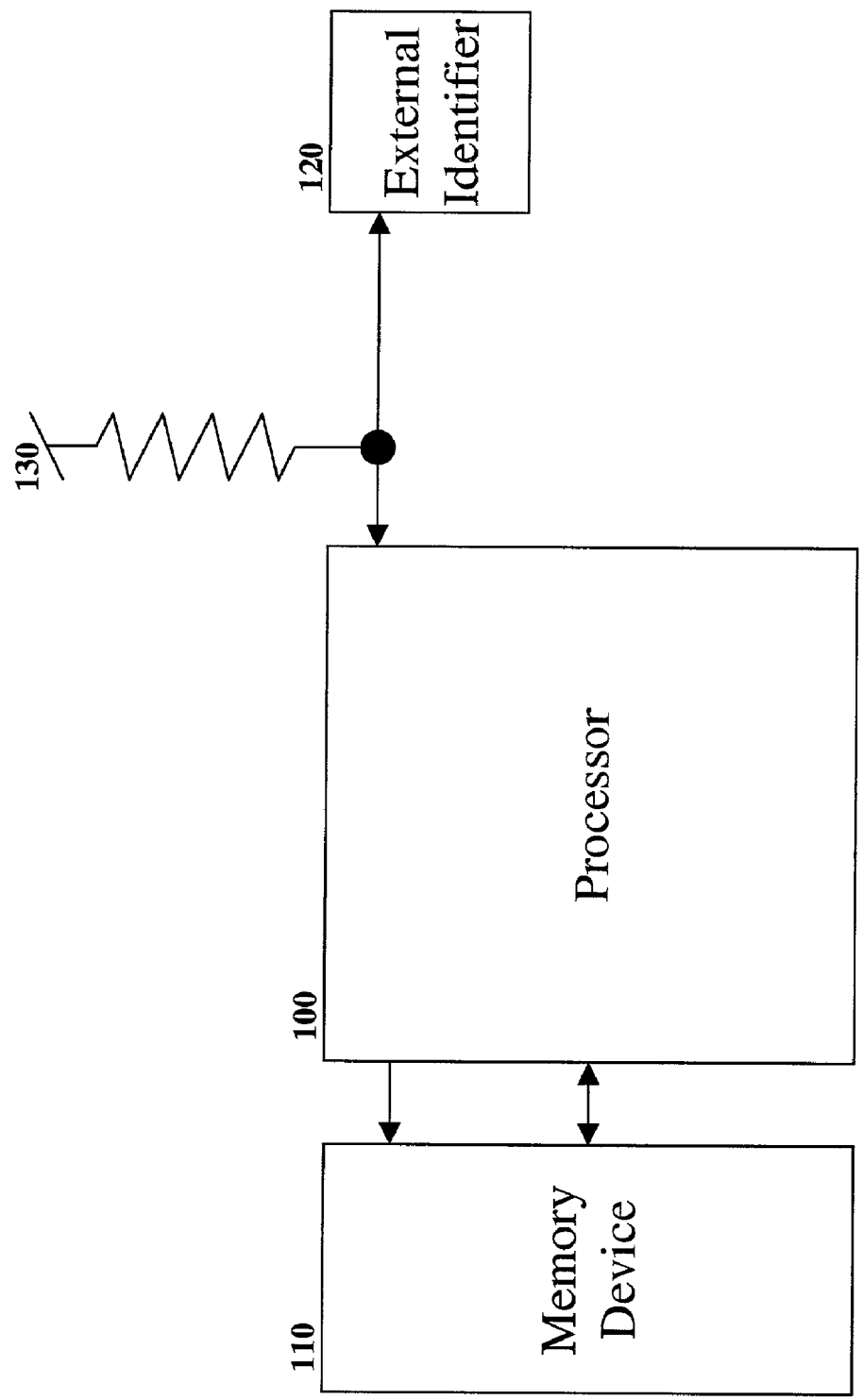
FIG. 1 is a block diagram illustrating the identification provider, processor, and memory.

One embodiment of a processor, identification code provider, and memory is illustrated in FIG. 1. The processor 100 generically refers to one or more processing elements, typically a microprocessor or a microcontroller. The processor 100 can also refer to a configurable system on a chip (CSoC) device. The processor 100 is connected to a programmable memory 110, which stores a program for the processing element, application data or configuration data used to program other devices such as, but not limited to, programmable logic devices such as field programmable gate arrays (FPGA's) or complex programmable logic devices (CPLDs) and CSoC devices. In one embodiment, the programmable memory 110 is an external Flash device that contains the configuration data used to program the configurable system logic (CSL) matrix embedded within the CSoC device and the application program that is executed on the embedded processor. In one embodiment, the Flash memory is a byte wide Flash device. A Flash is useful in this embodiment because a Flash bit can be programmed from a logic '1' to a '0' without being erased. However, once programmed to '0', it cannot be programmed back to a '1' without erasing the block or the entire device.

The processor 100 also has access to a separate identification code provider 120. In one embodiment, the processor 100 is coupled to the separate identification code provider 120. In an alternate embodiment, the identification code provider 120 is accessed over the Internet or through some other telecommunications device. In no embodiment is the identification code provider 120 embedded within the processor 100. In one embodiment, the identification code provider contains a unique 64-bit code. These elements may be stand-alone devices or may be integrated on a single chip or a combination thereof. In one embodiment, for a single wire connection between the identification code provider 120 and the processor 100, a pull up resistor 130 is also attached. In an alternate embodiment, multiple wire connections connect the identification code provider 120 to the processor 100.

Figure 2:
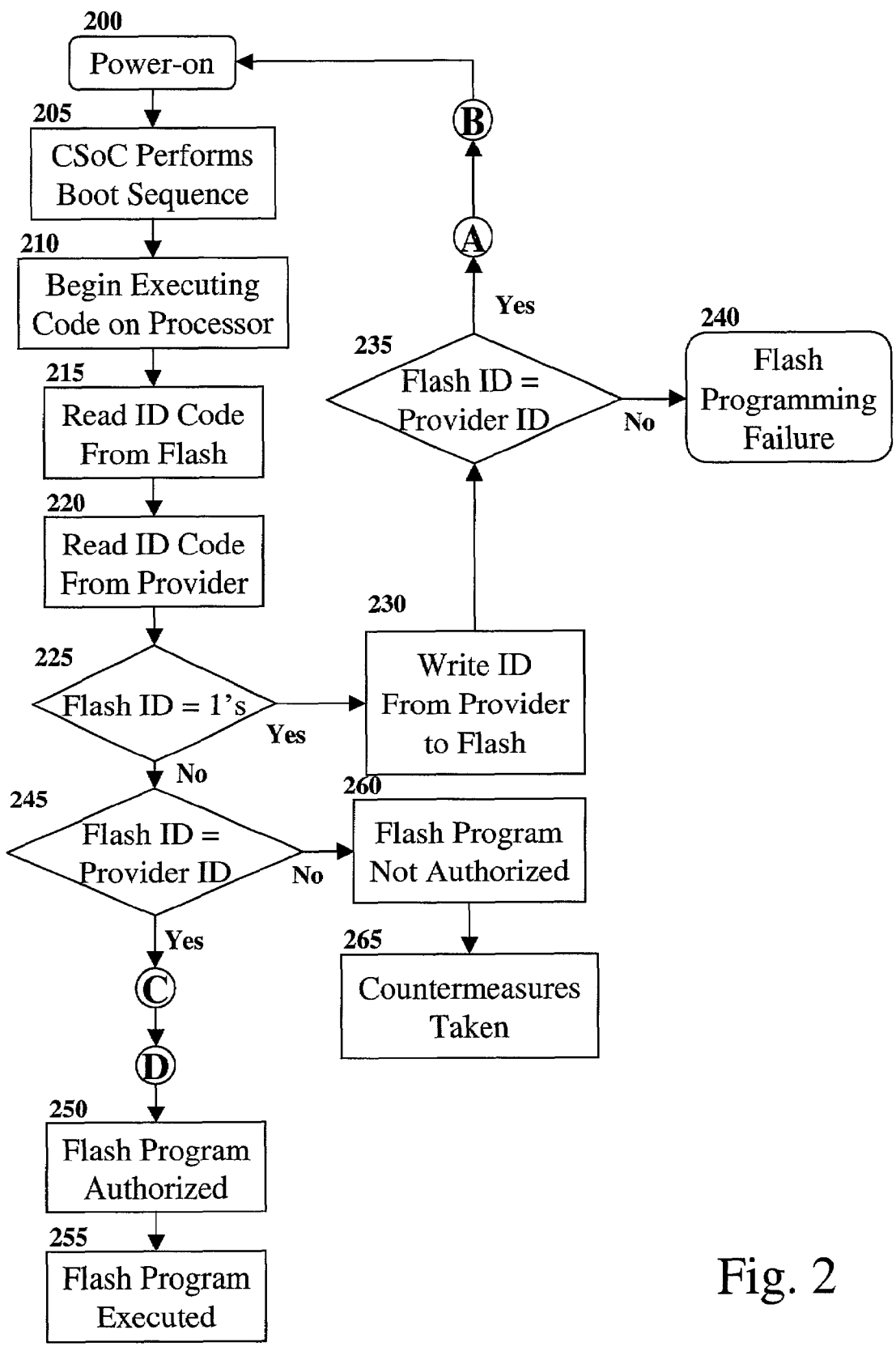
FIG. 2 is a flowchart of a method for operating the system.

One embodiment of the technique used to implement the security feature is illustrated in the flowchart of FIG. 2. The security system initiates the first time the device is powered on 200. In one embodiment, each board is programmed with a single, generic Flash image to simplify manufacturing. Customization is done automatically the first time the board powers up via the CSoC device via a start-up routine. These same steps could be performed before writing the image to the Flash memory. The generic image downloaded to Flash initially contains an 8-byte region with each byte location programmed with 0xFF (all one's) called ID Storage.

In one embodiment, the CSoC device performs the standard boot sequence, which includes loading the application from the memory 110 into the CSL matrix 205. The processor 100 begins to execute the code read from the memory 210. The 8 byte identification (ID) storage region is read from the Flash memory device 215. A 64 bit ID code is read from the provider 220. The ID storage from the Flash memory is checked 225. If the ID storage reads all 1's, the Flash memory is not yet copy protected and the 64-bit code from the provider 120 is written to the ID storage 230. The ID storage from the Flash is compared to the ID code read from the provider 235. If the ID storage matches the ID code, the system returns to the power on state 200. If the ID storage does not match the ID code, the processor notes that the Flash programming failed 240. If the ID storage does not equal all 1's, the ID storage of the Flash 110 is compared to the ID code from the provider 245. If the ID storage matches the provider ID code, the program stored on the Flash memory 110 is deemed authorized 250. The processor 100 can then begin executing the program 255. If the ID storage does not match the provider ID code, the program stored on the Flash memory is not authorized to execute on this processor 260. Match failure indicates either that an unauthorized copy of the Flash memory is being used or that there has been a failure with the communication link to the identification code provider. The appropriate counter measures are taken 265. These can include but are not limited to placing the part in power down mode, holding the processor in reset, erasing the entire Flash memory, or otherwise disabling the system. In the most drastic case, the application might reconfigure various PIO pins on the CSoC device to drive against outputs on another external device in an attempt to damage the system.

The start-up code could be made even more elaborate and obscure to foil potential copiers. In one embodiment, the ID Storage does not need to be in eight continuous bytes. It can be spread over the Flash memory. Likewise, the algorithm to match the provider ID code and the ID Storage from Flash does not need to be a direct bit-by-bit match. The matching algorithm can be a more complex algorithm, such as encryption, or reverse bit order, or just matching the CRC. Additionally, there could be multiple calls to the verification procedure buried throughout the application code—not just at power-up.

Figure 3:
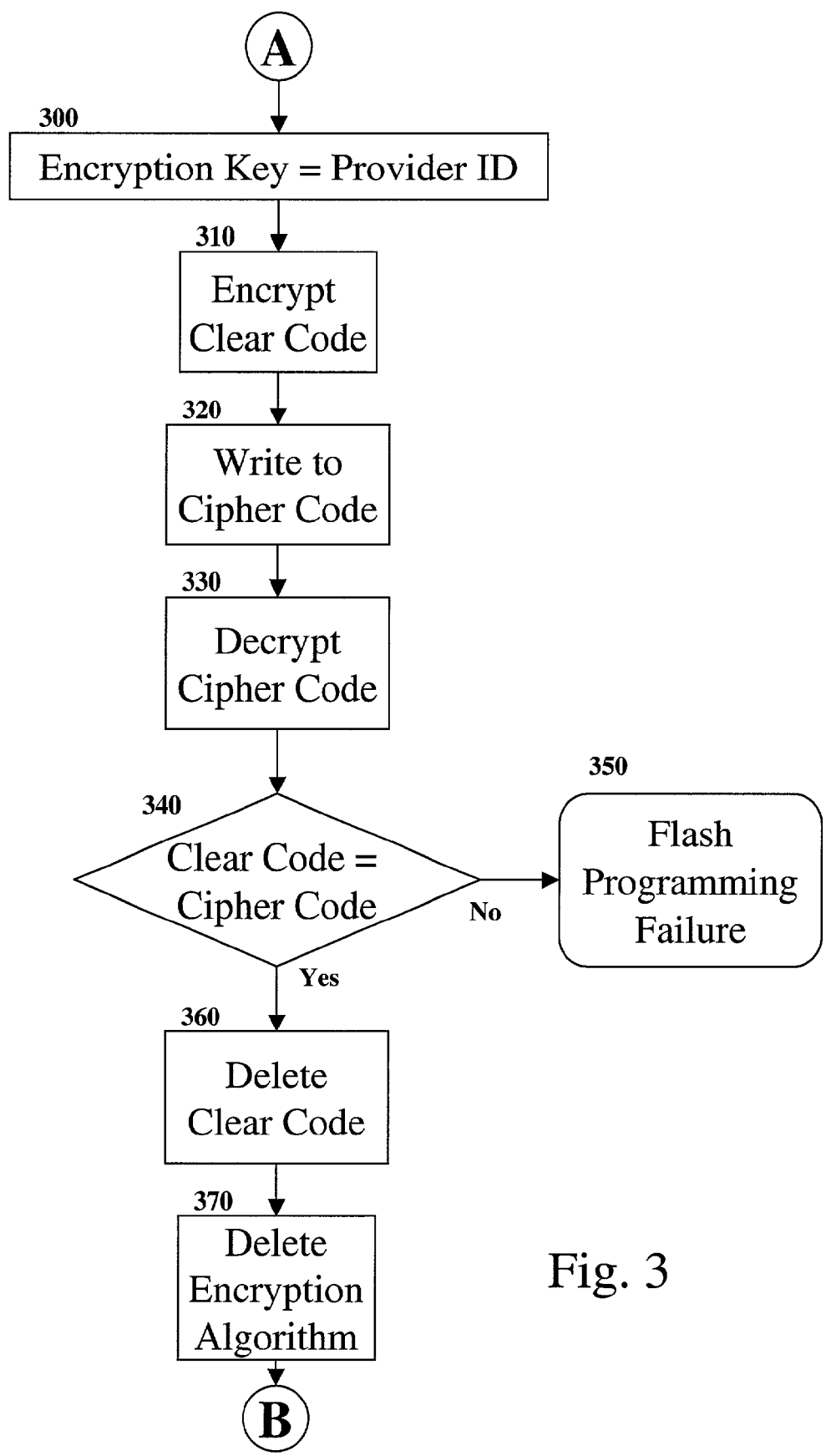
FIG. 3 is a flowchart of a method of encrypting the program.

One embodiment for further security for the program is achieved by encrypting the code stored in the memory 110. A technique for encrypting the program is described in the flowchart of FIG. 3. The flowchart of FIG. 3 would be inserted between points A and B in the flowchart of FIG. 2. In one embodiment, in the generic image, downloaded into each board, is a section of data containing the critical algorithms or perhaps the entire application, called clear code. As in FIG. 2, if the ID code in the ID storage matches the ID code of the provider, the ID code of the ID storage area of flash is set as the encryption key 300. Using that encryption key, the clear code is encrypted 310, and the results are written to a cipher code section of the memory 320. To verify that the Flash memory was programmed correctly, the cipher code is decrypted using the same encryption key 330. The decrypted cipher code is compared with the clear code 340. If the clear code fails to match the cipher code, the processor notes that the Flash programming failed 350. If the clear code matches the cipher code, the clear code is deleted 360. In one embodiment, the clear code is deleted by writing 0X00 to all clear code locations. In a further embodiment, the encryption algorithm is deleted 370. In an alternative embodiment, the code is encrypted externally before being loaded onto the Flash memory device. The encryption algorithm could be in many forms. In one embodiment, a one-way algorithm is used where the encryption and decryption algorithms are different.

Figure 4:
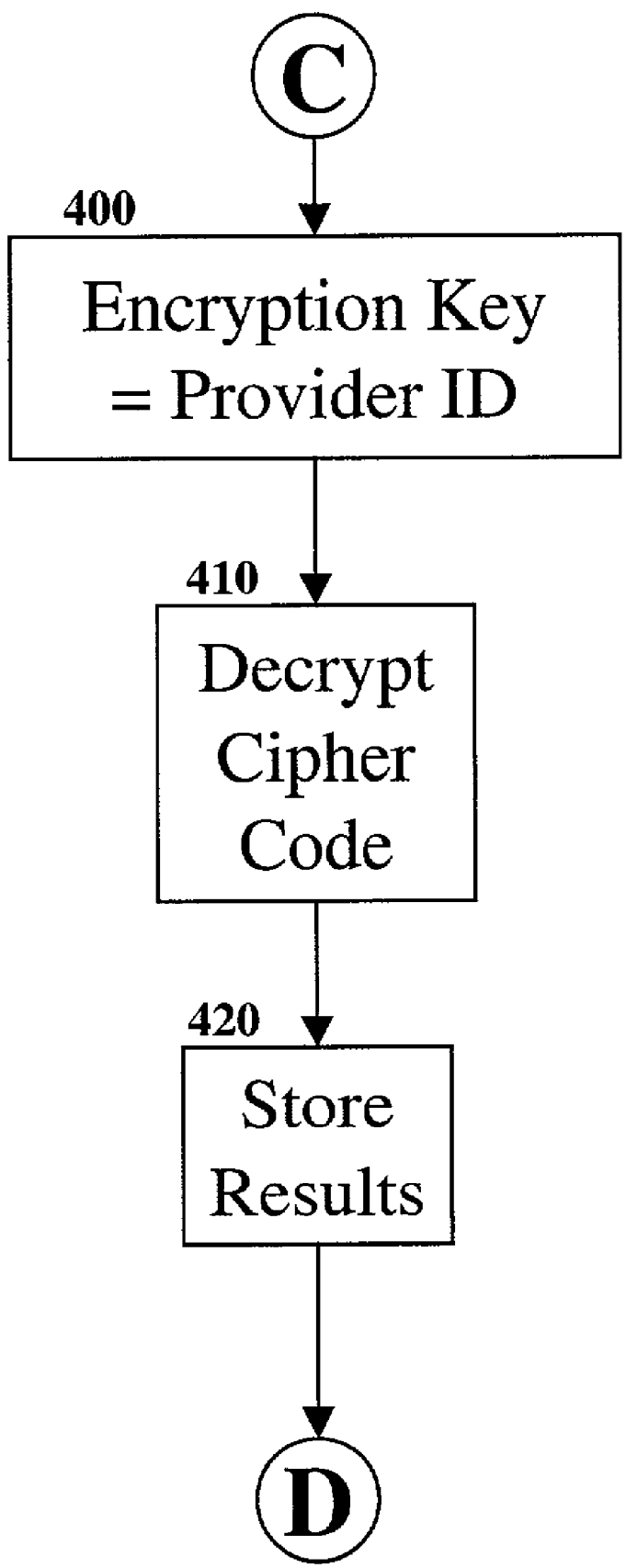
FIG. 4 is a flowchart of a method of decrypting the program.

A technique for decrypting the program is described in the flowchart of FIG. 4. Decryption occurs after booting the processor. The flowchart of FIG. 4 would be inserted between points C and D in the flowchart of FIG. 2. Either the ID code of the ID storage area of Flash 110 or the ID code of the provider 120 is set as the encryption key 400. Using the encryption key, the cipher code is decrypted 410. The results are stored in RAM, such as an internal SRAM, or are written to the erased Flash block 420. In one embodiment, only critical code is copied to internal RAM, with the remainder executing unmodified from Flash memory.

The method and apparatus disclosed herein may be integrated into advanced Internet-based or network-based knowledge systems as related to information retrieval, information extraction, and question and answer systems.

The method described above can be stored in the memory of a computer system (e.g., set top box, video recorders, etc.) as a set of instructions to be executed. The instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented by additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method, comprising:

using a processor to read a first unique identification code from a separate identification code provider;

using the processor to read a second identification code from a memory a first time;

comparing the second identification code to a predetermined value that indicates that the memory is not copy protected;

storing the first identification code as the second identification code in the memory in response to the second identification code read the first time being equal to the predetermined value;

using the processor to read the second identification code from the memory a second time;

comparing the second identification code read from the memory the second time to the first identification code;

indicating with the processor, failure to protect the memory in response to the second identification code read from the memory the second time being unequal to the first identification code;

using the processor to read the second identification code from the memory a third time;

comparing the first identification code to the second identification code read from the memory the third time;

allowing the processor to perform instructions contained in the memory if the first identification code matches the second identification code read from the memory the third time; and performing a security response if the first identification code does not match the second identification code read from the memory the third time.

2. The method of claim 1, wherein the separate identification code provider and the processor are coupled together.

3. The method of claim 1, further including accessing the separate identification code provider over the Internet.

4. The method of claim 1, wherein the security response is to shut down the processor.

5. The method of claim 1, wherein the security response is to erase the memory.

6. The method of claim 1, wherein the security response is to drive current against output pins of the processor and memory.

7. The method of claim 1, further including encrypting the second identification code.

8. The method of claim 7, further including decrypting the second identification code using the first unique identification code.

9. An apparatus, comprising:

means for using a processor to read a first unique identification code from a separate identification code provider;

means for using the processor to read a second identification code from a memory a first time;

means for comparing the second identification code to a predetermined value that indicates that the memory is not copy protected;

means for storing the first identification code as the second identification code in the memory in response to the second identification code read the first time being equal to the predetermined value;

means for using the processor to read the second identification code from the memory a second time;

means for comparing the second identification code read from the memory the second time to the first identification code;

means for indicating with the processor failure to protect the memory in response to the second identification code read from the memory the second time being unequal to the first identification code;

means for using the processor to read the second identification code from the memory a third time;

means for comparing the first identification code to the second identification code read from the memory the third time;

means for allowing the processor to perform instructions contained in the memory if the first identification code matches the second identification code read from the memory the third time; and means for performing a security response if the first identification code does not match the second identification code read from the memory the third time.

10. The apparatus of claim 9, wherein the separate identification code provider and the processor are coupled together.

11. The apparatus of claim 9, further including means for accessing the separate identification code provider over the Internet.

12. The apparatus of claim 9, wherein the security response is to shut down the processor.

13. The apparatus of claim 9, wherein the security response is to erase the memory.

14. The apparatus of claim 9, further including means for damaging the system as the security response.

15. The apparatus of claim 9, further including means for encrypting the second identification code.

16. The apparatus of claim 15, further including means for decrypting the second identification code using the first unique identification code.

17. An apparatus, comprising:

a separate identification code provider to provide a first unique identification code;

a memory to store an initial value as a second identification code; and a processor configured with code from the memory to read the first unique identification code from the separate identification code provider, read a second identification code from the memory a first time, compare the second identification code to a predetermined value that indicates that the memory is not copy protected, and store the first identification code as the second identification code in the memory in response to the second identification code read the first time being equal to the predetermined value, the processor being further configured with code from the memory to read the second identification code from the memory a second time, compare the first unique identification code with the second unique identification code read a second time, indicate failure to protect the memory in response to the second identification code read from the memory the second time being unequal to the first identification code, the processor being further configured with code from the memory to read the second identification code from the memory a third time, compare the first identification code to the second identification code read the third time, allow further execution of instructions from the memory in response to the first identification code matching the second identification code read the third time, and trigger a security response if the first unique identification code does not match the second identification code read the third time; and a circuit board connecting the processor, the memory, and the separate identification code provider.

18. The apparatus of claim 17, wherein the security response is to shut down the processor.

19. The apparatus of claim 17, wherein the security response is to erase the memory.

20. The apparatus of claim 17, wherein the security response is to drive current against output pins of the apparatus.

21. The apparatus of claim 17, wherein the second identification code is encrypted.

22. The apparatus of claim 21, wherein the second identification code is decrypted using the first unique identification code.

* * * * *